(12) United States Patent
Mafoti et al.

(10) Patent No.: US 7,064,162 B2
(45) Date of Patent: Jun. 20, 2006

(54) MOISTURE CURABLE ACRYLIC SEALANTS

(76) Inventors: Robson Mafoti, 5663 Lower Troy Rd., Temple, TX (US) 76501; Brian L. Damschroder, 9201 Elbe Trail, Fort Worth, TX (US) 76118; Larry R. Barron, 416 Brooks La., Coppell, TX (US) 75019

( * ) Notice: Subject to any disclaimer, the term of this patent is extended or adjusted under 35 U.S.C. 154(b) by 735 days.

(21) Appl. No.: 10/087,185

(22) Filed: Feb. 28, 2002

(65) Prior Publication Data

US 2002/0156174 A1   Oct. 24, 2002

Related U.S. Application Data

(63) Continuation-in-part of application No. 09/363,417, filed on Jul. 29, 1999.

(51) Int. Cl.
*C08L 83/00*   (2006.01)

(52) U.S. Cl. ............. 524/588; 525/383; 525/385; 525/386; 525/387; 528/491; 528/494

(58) Field of Classification Search ........... 524/588; 525/383, 385, 386, 387; 528/494
See application file for complete search history.

(56) References Cited

U.S. PATENT DOCUMENTS

| | | | |
|---|---|---|---|
| 4,043,953 A | 8/1977 | Chang et al. | 260/18 |
| 4,147,685 A | 4/1979 | Smit, Jr. | 260/31.2 |
| 4,177,301 A | 12/1979 | Smith, Jr. | 427/401 |
| 4,707,515 A | 11/1987 | Gilch et al. | 524/506 |
| 4,818,790 A | 4/1989 | Ooka et al. | 525/103 |
| 5,244,950 A | 9/1993 | Schlarb et al. | 524/114 |
| 5,281,468 A | 1/1994 | Klier et al. | 428/209 |
| 5,319,044 A | 6/1994 | Jung et al. | 526/279 |
| 5,705,561 A | 1/1998 | Kozakiewicz et al. | 524/730 |
| 5,994,428 A | 11/1999 | Lutz et al. | 523/201 |

*Primary Examiner*—Edward J. Cain
(74) *Attorney, Agent, or Firm*—Jason R. Fulmer; Thomas C. Wright; Gardere Wynne Sewell, LLP

(57) ABSTRACT

Improved sealant compositions and processes for producing sealant are described. The processes include contacting in a reactor under reaction conditions a polymer containing at least one vinyl, acrylate, or methacrylate monomer and at least one silane comonomer, at least one polymer capping agent, a catalyst and a reactive diluent. Sealant compositions are also described. The compositions include a polymer containing at least one vinyl, acrylate or methacrylate monomer and at least one silane comonomer, at least one silane component, a catalyst and a reactive diluent.

37 Claims, No Drawings

MOISTURE CURABLE ACRYLIC SEALANTS

TECHNICAL FIELD OF THE INVENTION

This is a continuation-in-part of Ser. No. 09/363,417 filed with the United States Patent and Trademark Office on Jul. 29, 1999. The present invention relates generally to the field of moisture curable sealants. More particularly, the present invention relates to sealants that are warm-applied, have improved viscosity and adhesive characteristics, and contain low amounts of solvent.

BACKGROUND OF THE INVENTION

Without limiting the scope of the invention, its background is described in connection with compositions and methods for the use of a sealant that is curable using ambient moisture at room temperature, as an example.

Various sealant compositions are available that may be cured by exposure to atmospheric moisture, such as those that are based on isocyanate-terminated polyurethanes or silicone polymers. One type of sealant is a so-called "hot melt adhesive." Typical hot melt adhesives set quickly due to instant cooling after application and thus provide a narrow window of time in which the position of a substrate, such as glass, may be adjusted within the frame after application. Hot melt adhesives also require high application temperatures typically in excess of 300° Fahrenheit.

Sealant formulations used as joint fillers in the construction industry are available that generally contain high molecular weight polymers or copolymers in order to satisfy movement requirements due to thermal expansion of certain substrate materials. To meet extrudibility requirements, sealant formulations containing these high molecular weight polymers or copolymers must also contain relatively large amounts of solvent to reduce the viscosity of the sealant formulation. High amounts of solvent, however, may be undesirable in sealant formulations since the solvent may cause shrinkage of the sealant formulation during curing, which can lead to sealant failure.

SUMMARY OF THE INVENTION

What is needed is a sealant composition curable by atmospheric moisture that forms a resilient seal at ambient temperatures yet has a low amount of undesirable solvent. Also needed is a sealant that has improved viscosity and adhesive qualities. In addition, a sealant is needed that cures by atmospheric moisture to allow for re-seating of the substrate if necessary.

In one embodiment of the present invention, a process for producing a sealant is described. The process includes contacting in a reactor under reaction conditions a polymer containing at least one vinyl, acrylate, or methacrylate monomer and at least one silane comonomer; at least one polymer capping agent, a catalyst and a reactive diluent. In another embodiment of the present invention, a sealant composition is described. The composition includes a polymer containing at least one vinyl, acrylate or methacrylate monomer and at least one silane comonomer; at least one polymer capping agent; a catalyst; and a reactive diluent.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not limit the scope of the invention.

The present invention contemplates compositions and methods for making a moisture curable sealant with increased green strength, adhesiveness and resiliency. Compositions useful in the present invention include a base polymer having a glass transition point lower than 10 degrees Fahrenheit and an average molecular weight in the range of from about 40,000 to about 500,000. The polymer is initiated by the addition of a free radical generating initiator. Free radical polymer initiators are well known to those of skill in the art and are selected based on the speed, temperature, catalytic target and the like. Used as an example herein is t-butyl peroctoate, which is introduced as a polymer initiator or promoter that catalyzes the polymerization of the monomers into polymer chains.

The base polymer is then mixed with additives and a catalyst to produce a moisture curable sealant that may be warm applied or applied at room temperature in solvent.

Moisture curable sealant compositions of the present invention may be warm applied or may be applied as a low viscosity solvent-containing sealant under ambient conditions. When warm applied, sealants of the present invention are distinct from hot melt sealants in that the method of curing sealants of the present invention does not depend on temperature. As distinguished from hot melt sealants, such as isocyanate moisture-curable hot-melt sealants, sealants of the present invention for warm application may be stored as a viscous semi-solid and may be warmed to increase mobility. Warm-applied sealants of the present invention are generally not melted and hardened, as is the case with hot melt sealants. Rather, upon cooling, sealants of the present invention may cure upon exposure to atmospheric moisture to form a non-thermoplastic sealant, which may be highly elastic and adhesive.

Sealants of the present invention cure chemically, not thermally, and are stable in the warm form as compared to conventional moisture curing hot melt sealants based on polyurethane chemistry. Sealants of the present invention may be produced by admixing a polymer with various additives that produce a sealant with superior green strength and curability. Unlike conventional hot melt sealants, warm-applied sealants of the present invention allow for repositioning of substrates after application and prior to curing.

A desirable window sealant generally possesses the following properties: adhesion strength, low temperature flexibility, resistance to weathering (i.e., resistance to UV radiation), shelf life and ease of application. In addition to these features, a window sealant may also be expected to have sufficient green strength to provide proper stability in the seal between application and complete curing.

Low temperature flexibility is a desirable property for window sealants, as windows tend to flex under wind-loading. Furthermore, as window support structures tend to expand and contract due to thermal variations and flex due to wind-loading, it is desirable for the sealant to maintain its flexibility at both low and high temperatures. The glass transition temperature ($T_g$) of a sealant is a common indicator of low temperature flexibility.

The evaluation of low temperature flexibility is described in the guidelines of the American Architectural Manufacturer's Association ("AAMA") for sealants. AAMA requires that windows undergo a low temperature flexibility test, in which a sealant is applied to an aluminum panel. The sealant is allowed to cure and then the panel is cooled to 7° Fahrenheit and then bent 180° around a one inch mandrel. After bending, the specimens are examined for cracking and loss of adhesion to the aluminum panel.

Resistance to weathering is another desirable property for a window sealant, as many materials degrade upon extended exposure to UV radiation, resulting in their becoming brittle, cracked and/or discolored. Another important feature is moisture resistance, especially for use with wooden frames and structures that are susceptible to moisture damage.

Yet another desirable property is coating adhesion. The window sealant must provide a surface that may not only be painted, but that promotes the adhesion of the material to paint. For example, it is well known in the art that silicon-based sealants generally do not provide a surface to which coatings, such as paint, will adhere.

The adhesion of a sealant to a window frame is typically evaluated in two ways. The first is a wind test, in which the glass is secured in the window frame using the sealant, the assembled window and frame are anchored in a retaining frame and the secured window is placed in a wind tunnel or similar device. Positive and negative pressure is applied to the window until the window breaks loose from the frame or fails. The second test used to evaluate the adhesion properties of a sealant to glass is the AAMA's "Peel Adhesion" test, in which the sealant is applied to an aluminum or glass panel, allowed to cure and then peeled away from the panel. The cohesive failure and adhesive failure of the strip, in pounds-force per inch of width, is determined and evaluated. Sealants of the present invention have a glass peel cohesive failure (CF) value in the range of from about 16 to about 36 pounds-force per inch of width, and an aluminum peel adhesive failure (AF) value in the range of from about 8.75 to about 28.75 pounds-force per inch of width.

From a manufacturing standpoint, similar features are desired from a window sealant. For example, it is desirable that window sealants have a long shelf life. The green strength of the sealant is important from the perspective of handling and transporting the windows after assembly. Cure time, shear strength and the rate of strength development during and immediately following the assembly are important to coordinate the throughput of units and storage space. Other physical properties that are indicative of the suitability of a window sealant for a given application are: yield strength, slump, vehicle migration, staining, racking, water resistance and penetration. The methods and quantitation of these results are outlined in the AAMA's "Voluntary Specifications and Test Methods for Sealants," relevant portions of which are incorporated herein by reference as to the methods and specifications for testing sealants.

The present invention provides for a sealant that has both a long open time and long shelf life. Heating the sealant facilitates the delivery of the material and does not melt the composition. The heat merely reduces the viscosity of the material to a desirable level for application to a surface for mounting glass. The green strength of the sealant of the present invention is also improved over existing compositions from the perspective of handling and transporting the windows after assembly. Furthermore, using the base polymer to make the sealant and methods of the present invention, a window sealant with improved cure time, shear strength and the rate of strength development is obtained.

In order to provide a cured sealant composition having desirable flexibility at temperatures to which the sealant may be exposed, it is necessary for the sealant to employ a base polymer having a glass-transition temperature ($T_g$) not greater than about 10 degrees Fahrenheit. The $T_g$ of a polymer is generally regarded as the temperature below which the polymer has reduced, and in most cases nonexistent, flexibility. The $T_g$ of a polymer is described by Flory, "Principles of Polymer Chemistry," pp 56–57 (Cornell University Press), the relevant portions of which are incorporated herein by reference. While the $T_g$ of a given polymer may be measured (e.g. by DSC measurement method), it may also be calculated as described by Fox, Bull. Am. Physics Soc., p. 153 (1956). Examples of $T_g$ of certain polymers are generally known to those of skill in the art with particular reference given by: Brandrup, J and Immergut, E. H.; Polymer Handbook (Wiley).

The molecular weight and viscosity of the polymer incorporated into the sealant is another important consideration for the present invention. If the viscosity of the polymer is too low, the viscosity of the sealant composition made with the polymer base prior to curing may be too low for ease of application. In other words, it must be sufficiently viscous to be applied to a window without running or dripping off the window surface during application. As a corollary, if the molecular weight of the polymer is too low, the cured polymer may not be strong enough for use as a window sealant.

Highly viscous polymers, however, may lead to use of excessive amounts of solvents or plasticisers or require a high temperature for application. Furthermore, the viscosity and polymerization rate and the features of the base polymer and the final sealant may reduce the risk of shrinkage or weakening of the cured seal. In one embodiment of the present invention, the base polymer for use in the sealant composition generally has an average molecular weight ($M_w$) in the range of from about 40,000 to about 500,000. In another embodiment of the present invention, the polymer may have a molecular weight in the range of from about 50,000 to about 150,000. In another embodiment of the present invention, the polymer may have a molecular weight in the range of from about 70,000 to about 100,000. The molecular weight may be determined by gel permeation chromatography using, e.g., a U-Styragel with $10^5$, $10^4$, $10^3$, and 500 Angstrom columns calibrated with polystyrene standards.

It should be noted that those of skill in the art will know that the distribution of molecular weights of a polymer exist in any finite sample of polymer, and the number average molecular weight ($M_n$) reflects the number average molecular weight of the polymer molecules in the sample measured. The average molecular weight value is an important guide to various properties including, e.g., the tensile strength of the polymer.

In addition to sealants, compositions described herein may also be used in applications such as sealant adhesives, pressure-sensitive adhesives, water proofing agents, casting rubber materials and foaming materials. For example, compositions of the present invention have been used to seal windows in compliance with the AMAA's guidelines for sealants. According to one embodiment of the present invention, a method of curing a sealant is disclosed and includes mixing the components in a relatively moisture-free condition. Once blended, the composition may be stored for a prolonged period at ambient temperature without degradation in a sealed container. Compositions of the present invention cure rapidly to form a good rubber elastomer upon exposure to atmospheric moisture.

Sealants of the present invention may be used as a one-component elastomeric sealing material that displays superior weather resistance, may be transparent or pigmented and have high tensile strength and elongation. Sealants of the present invention readily accept paint, which is in contrast to silicone-based sealants, which do not. Sealants of the present invention also display improved characteristics for use as a highly elastic sealant in window creation and packaging, as well as other areas.

Sealants of the present invention may also be used as a waterproofing agent. In addition, sealants of the present invention exhibit a good balance between breaking strength, elongation, and glass transition temperature, while at the same time being characterized by a long storage life and improved application during manufacturing as compared to products prepared by existing techniques using more expensive components.

Sealants of the present invention may also be used as an adhesive. Sealants of the present invention exhibit high bond strength, in particular, a good balance between peeling bond strength and shearing bond strength, and therefore may be used in various applications as a bedding sealant in the formation of large and small windows.

Sealants of the present invention may be applied readily to horizontal or vertical joints, and exhibit a tough resilient condition upon curing by exposure to atmospheric moisture. In addition, sealants of the present invention provide a seal having good resistance to aging by UV, heat and moisture, and resilience and extensibility in the joint. Some of the properties mentioned above are dependent on the selection of the substantially linear monomers used to form the polymer.

Sealants of the present invention also exhibit desirable viscosity for use in a variety of applications. Viscosity is determined, for example, using a 70–80% solution in an organic solvent such as toluene or xylene at room temperature. Sealants of the present invention may have a viscosity in the range of from about 1000 to about 50,000 Centipoise measured at about 77 degrees Fahrenheit in about 70% toluene. Sealants of the present invention also may possess a glass-transition temperature ($T_g$) not greater than about 10 degrees Fahrenheit (−12.2 degrees Centigrade). Silane and linear monomers used in the present invention are selected and used in quantities that may provide a fluid polymer. Polymers produced in accordance with the present invention are generally homogeneous having an average molecular weight of between about 40,000 and 500,000.

The present invention includes a flowable sealant composition for use in windowpane sealing. The composition includes a fluid polymer material that is a reaction product of a substantially linear polymerized linear vinyl, acrylate and methacrylate monomers in a free radical process.

The polymer is then formed into a sealant by the addition of a cross linking catalyst to form a sealant that is curable by exposure to atmospheric moisture and that forms a resilient solid. Other additives, such as rheology control agents may be added to control the features of the sealant, as described herein. An important feature of the invention is the selection of reactants for the polymer and the capping of the polymer using, e.g, a mercaptan-group containing silane.

Polymers

Polymers produced in accordance with the present invention may be polymers or co-polymers of at least one vinyl, acrylate, or methacrylate monomer and at least one silane comonomer. Polymers produced in accordance with the present invention may be used in a sealant and may be applied, for example in window construction.

Vinyl monomers useful in the present invention include compounds having a vinyl grouping ($CH_2=CH-$). Useful examples include, but are not limited to, vinyl acetate, acrylonitrile, methacrylonitrile, methyl acrylate, methyl methacrylate, styrene, dioctyl fumarate, dioctyl maleate and maleic and hydride, and the like and mixtures thereof.

Acrylate monomers and methacrylate monomers useful in the present invention include linear or substantially linear acrylate and linear or substantially linear methacrylate monomers. The linear nature of monomers useful in the present invention generally may affect the flow properties of the sealant. The monomers may be linear acrylate ester monomers (e.g., ones that are soluble in methylene chloride, tetrahydrofuran, toluene, xylene and ethyl acetate) in varying concentrations relative to each other. Examples of useful monomers include, but are not limited to, alkyl acrylates containing in the range of from about 1 to about 14 carbons such as methyl acrylate, ethyl acrylate, and butyl acrylate. Other useful examples include, but are not limited to, laurel methacrylate, 2-ethyl hexyl acrylate, methyl methacrylate, ethyl methacrylate, butyl methacrylate, 2-ethyl hexyl methacrylate, octyl methacrylate and stearyl methacrylate, and the like and mixtures thereof. In one embodiment of the present invention, a mixture of acrylate, methacrylate, and vinyl monomers may be used. In another embodiment of the present invention a 27:31:10 weight to weight ratio of butyl acrylate:methyl acrylate:laurel acrylate is included.

Monomers of the present invention may be slightly branched provided that the flow characteristics of the resulting polymer are not adversely influenced. In one embodiment of the present invention, polymers may include in the range of from about 27 to about 70 weight percent of alkyl acrylate monomers.

Polymers of the present invention also may include at least one silane comonomer. Silane functional groups of silane comonomers may be randomly interposed along the polymer backbone to provide for moisture curing of the polymer. The present invention may include organic silanes, examples of which include but are not limited to, vinyltrimethoxysilane, vinyltriethoxysilane, vinyltris(2-methoxyethoxy)silane, 3-[tris(trimethylsiloxy)silyl]propyl methacrylate, vinyl methyldimethoxysilane, vinyl methyldiethoxysilane, vinylphenyldimethoxysilane and vinyl oximinosilane. In one embodiment of the present invention, methyl trimethoxysilane may be used. Methyl trimethoxysilane may be useful both as a moisture scavenger and as a crosslinking agent. Vinyl trimethoxysilane may be useful for incorporation into the polymer to yield pendant silane side groups which are also capable of forming crosslinks. The polymer may include from about 0.23 to about 0.8 weight percent of one or more silane co-monomers.

To provide for the capping of the polymer chain, and consequently increase the stability and uniformity of the polymer for use in the sealant composition, a polymer capping agent is included. Useful polymer capping agents include alkoxy silanes such as mercapto-containing alkoxy silanes. Examples include, but are not limited to, mercaptopropyl trimethoxysilane, g-mercaptopropyltrimethoxysilane, mercaptopropyl triethoxysilane, mercaptopropyl tripropoxysilane, mercaptopropyl tributoxysilane and g-glycidoxypropyltrimethoxysilane. The polymer may include in the range of from about 0.15 to about 0.40 weight percent polymer capping agent. The polymer capping agent may be selected generally to provide a terminal functional group and to help control molecular weight.

Other examples of other organic silane crosslinking/moisture scavenging agents include, but are not limited to, methyltrimethoxysilane, dimethyldimethoxysilane, trimethylmethoxysilane, methyltriethoxysilane, dimethyldiethoxysilane, methyltriethoxysilane, phenyltrimethoxysilane, diphenyldimethoxysilane, triphenylmethoxysilane, phenyltriethoxysilane, diphenyldiethoxysilane, vinyltriacetoxysilane, methyltri(dimethylamino)silane, methyltri(N,N-methylethylaminoxy)silane, methyltri(N-methyl-N-acetylamino) silane, methyltri(isopropenoxy)silane, vinyltrimethoxysilane, vinyltriethoxysilane, γ-methacryloxypropyltrimethoxysilane, γ-methacryloxypropylmethyldimethoxysilane, methyltriacetoxysilane, γ-glycidoxypropyltrimethoxysilane, γ-aminopropyltriethoxysilane, beta-(3, 4-epoxycyclohexyl)ethyltrimethoxysilane, γ-aminopropyltrimethoxysilane, N-(2-aminoethyl)-γ-aminopropyltrimethoxysilane, N-(2-aminoethyl -γ-aminopropylmethyldimethoxysilane, N-(2-aminoethyl)aminomethyltrimethoxysilane, dimethoxymethyl-3-pyperazinopropylsilane, 3-piperazinopropyltrimethoxysilane, N-(3-triethoxysilylpropyl)urea, N-phenyl-γ-aminopropyltrimethoxysilane and the like, although the present invention is not limited thereto. In addition, partial hydrolysis condensates of the above organic silanes may be used.

Sealant

Sealant compositions according to the present invention are flowable during the window assembly process so that a single application may be used on the window and require no curative agent other than atmospheric moisture. The sealant will generally be a mixture of a polymer base and various additives, as described hereinbelow and in Example I, with a sealant cross-linking catalyst or promoter.

In use, the final sealant may provide a viscous liquid composition having sufficient solvent to provide a sufficiently low viscosity at room temperature for application; or may provide a semi-solid composition that after application at a sufficient temperature provides sufficient green strength in the setting of glass. If kept protected from water or moisture, the consistency of the sealant will remain the same until exposed to humid conditions. The sealant composition generally cures within a short period of time with atmospheric moisture, whether as a solvent containing viscous liquid or a warm applied semi-solid solvent version. The cured sealant forms a permanently resilient and pliable product with a $T_g$ in the range of from about −50° F. to about 10° F. Sealants intended for exterior use are expected to encounter temperatures below 0° C. As sealants may be used on interior or exterior windows, the present invention was designed and selected to form a sealant based on a polymer having a $T_g$ of between about −50 and about 10 degrees Fahrenheit.

The curing rate generally will be dependent on, e.g., the relative humidity, temperature, amount of solvent and the amount of cross-linking catalyst. A desirable cure rate for sealants curing at room temperature is about 5 mm thickness per day, which may be achieved with sealant compositions according to the present invention that include a catalyst. As used herein, the term "catalyst" is used to describe any free radical generator. Catalysts useful in the present invention are included in an effective amount to catalyze the reaction. The amount used generally has a correlation to the curing rate of the sealant. Examples of useful catalysts include, but are not limited to, t-butyl peroctoate, toluene, and organo-tin catalysts such as dioctyl tin dilaurate. Generally, catalysts useful in the present invention may be described as cross-linking catalysts that may add varying degrees of strength and adhesiveness to the sealant. Also, catalysts useful in the present invention may be described as an additive that is capable of accelerating cross-linking of the polymer.

Sealants of the present invention may also contain one or more additives. Additives useful in the present invention may include, for example, catalysts as described above, water scavengers, UV blockers, fillers and rheology control agents such as thixotropic agents, fumed silica, and wetting agents to enhance thixotrophy. Examples of useful wetting agents include, but are not limited to, glycols, silanes, anionic surfactants, and any other wetting agents known in the art. Additives such as solvents, plasticizers, adhesion promoters, and other additives known in the sealant art may also be used. Generally, the type and amount of additive used depends on the desired properties and use of the sealant.

Sealants of the present invention may be formed in any suitable reactor such as for example, a large scale reactor, or a small-scale reactor such as a four-neck glass reactor employing a stirring rod, temperature probe, addition funnel and a reflux drip-leg heating mantle to control temperature. Sealants of the present invention may also be formed in a mixing unit containing a sweep blade employing a high-speed dispenser. For example, according to the present invention, the appropriate amount of the polymer prepared (as previously described) is placed in a mixer along with a cross linking catalyst such as an organo-tin catalyst that promotes the cross linking process. In addition, a water scavenger agent (such as methyltrimethoxy silane), a thixotropic agent (such as fumed silica), an epoxy silane cross-linker for curing or a wetting agent (such as propylene glycol for example), may be added. The reaction condition or conditions may be any suitable condition effective to produce sealants of the present invention. In one embodiment of the present invention, the reaction is carried out at a temperature within a range of from about 75° F. to about 100° F. In another embodiment of the present invention, the reaction is carried out at a temperature of from about 150° F. to about 250° F.

Sealants of the present invention may be formed in the presence of a reactive diluent. Reactive diluents of the present invention generally are agents that react with components that make up the sealant. In addition, reactive diluents may reduce the amount of solvent contained in the sealant composition, since it is believed that large amounts of solvent in the final sealant may cause shrinkage of the sealant formulation during curing, which can lead to sealant failure. Examples of reactive diluents useful in the present invention include, but are not limited to, alkylene carbonates. Examples of useful alkylene carbonates include, but are not limited to, ethylene carbonates, propylene carbonates, butylenes carbonates, and the like, and mixtures thereof. The reactive diluent may be added to the polymer composition in an amount sufficient to reduce an amount of solvent used, thus allowing for a greater percent yield of solvent material when the sealant is formed. In one embodiment of the present invention, reactive diluents may be present in an amount in the range of from about 0.1 to about 5 weight percent of the sealant. In another embodiment, the reactive diluent is present in an amount in the range of from about 0.2 to about 0.4 weight percent.

As used herein, the term "solid yield" is defined as being the sealant product excluding solvent. In one embodiment of the present invention, the sealant contains in the range of from about 90 to about 99 weight percent solid yield. In another embodiment of the present invention, the sealant contains in the range of from about 95 to about 99 weight percent solid yield. In another embodiment of the present invention, the sealant contains in the range of at least 98 weight percent solid yield.

Sealants of the present invention may also include additional silane comonomers and/or additional polymer capping agents that may be the same or different from silane comonomers and polymer capping agents that may be contained in the base polymer. Generally, the additional silane comonomer and/or additional polymer capping agent may be combined with or added to polymers useful in the present invention.

The following examples are presented to further illustrate the present invention and are not to be construed as unduly limiting the scope of the present invention.

EXAMPLE I

This example illustrates the preparation of several polymers used in the present invention. The polymers prepared in this example may be then combined with, for example, a silane comonomer and/or capping agent to form sealants of the present invention. One skilled in the art will recognize that by varying the concentrations and types of components of the present invention, features of the sealant produced may be modified. For example, the amount and type of polymer used may be varied to achieve certain viscosity, flowability, elasticity and transparency characteristics of the sealant desired. In addition, the monomers and comonomers used may be varied to increase or decrease, for example, the average molecular weight of the polymer. Likewise, catalysts and additives serving as moisture scavengers may be varied, depending on the amount of tolerable moisture and rate of polymer formation required.

The polymers of this example were prepared by combining each component, as indicated in Table I, except t-butyl peroctoate serving as a catalyst, in a jacketed reactor in the indicated proportions (shown as percent by weight) while reserving some of the toluene. The catalyst was placed in a second vessel and mixed with the reserved toluene. The solutions from these two mixtures were pumped into a third jacketed vessel at a controlled rate so as to maintain the reaction at the reflux temperature of toluene to produce polymers A, B, C, and D. Polymer A possessed a molecular weight of approximately 165,000 g/mol. Polymer B possessed a molecular weight of approximately 185,000 g/mol. Polymer C possessed a molecular weight of approximately 87,000 g/mol and Polymer D possessed a molecular weight of approximately 85,000 g/mol.

TABLE I

Base Polymer Compositions

| Component | Polymer A | Polymer B | Polymer C | Polymer D |
|---|---|---|---|---|
| Butyl Acrylate | 27.50% | 27.25% | 27.36% | 34.55% |
| Methyl Acrylate | 30.90% | 30.58% | 30.70% | 23.03% |
| Lauryl Methacrylate | 10.00% | 9.87% | 9.91% | 9.83% |
| Trimethylolpropane Trimethacrylate | 0.16% | 0.16% | — | — |
| Methyltrimethoxysilane | 0.24% | 0.24% | 0.24% | 0.23% |
| Vinyltrimethoxysilane | 0.29% | 0.28% | 0.29% | 0.28% |
| g-mercaptopropyltrimethoxysilane | 0.14% | 0.14% | 0.29% | 0.28% |
| Acrylonitrile | — | 0.95% | 0.87% | 0.80% |
| t-Butyl Peroctoate | 0.16% | 0.16% | 0.24% | 0.24% |
| Toluene | 30.61% | 30.37% | 30.10% | 30.76% |

EXAMPLE II

The base polymers described in Example I were formulated into sealant formulations described below in Table II as sealants A-H. The components were placed in a mixer containing a sweep blade and a high speed dispenser until they were thoroughly mixed. Each of the compositions in Table II produced a sealant with acceptable properties after it was cured, whether warm applied or applied at room temperature. When applied at room temperature, sufficient solvent was present to maintain a viscosity sufficiently low for application.

TABLE II

| Components | Sealant A | Sealant B | Sealant C | Sealant D | Sealant E | Sealant F | Sealant G | Sealant H |
|---|---|---|---|---|---|---|---|---|
| Polymer | A | B | C | C | C | C | C | D |
| | 2444 g | 300 g | 300 g | 300 g | 300 g | 300 g | 300 g | 2630 g |
| MTMS[1] | 37.5 g | 4.6 g | — | — | 4.6 g | 4.5 g | 4.5 g | 39.5 g |
| Aerosil | R972 | R972 | — | R972 | 200 | — | 130 | R972 |
| | 100.1 g | 12.0 g | — | 12.0 g | 12.0 g | — | 12.0 g | 158.0 g |
| (3-glycidoxypropyl) trimethoxysilane | 10.0 g | 1.2 g | — | 1.2 g | 3.0 g | 3.0 g | 3.0 g | 26.0 g |
| MOS[2] | 10 g | — | — | — | — | — | — | — |
| Organotin carboxolate | 10.0 g | 1.2 g | 1.2 g | 1.5 g | 1.5 g | 1.5 g | 1.5 g | 13 g |
| g-Ureidopropyltrimethoxysilane (Y-11542) | — | 1.2 g | — | — | — | — | — | — |
| Propylene Glycol | — | 1.2 g | 1.2 g | 1.2 g | 1.5 g | 1.5 g | 1.5 g | 13 g |
| n-2-aminoethyl-3-aminopropyltrimethoxysilane | — | — | 3.0 g | — | — | — | — | — |
| Octyltriethoxysilane | — | — | — | 4.5 g | — | — | — | — |
| Cab-o-sil M5 | — | — | — | — | — | 12.0 g | — | — |

[1]Methyltrimethoxysilane
[2]Methyl Oximino Silane

EXAMPLE III

Additional polymers were prepared according to methods of the present invention. The polymers were prepared in a four-neck glass reactor. The polymer labeled P1 in Table III was prepared as follows: 2169 g of butyl acrylate monomer, 2434 g of methyl acrylate monomer, 786 g of lauryl methacrylate monomer, and 64 g of acrylonitrile was combined with 18.7 g of methyltrimethoxysilane comonomer and 7.5 g of vinyl trimethoxysilane comonomer and 22.6 g of g-mercaptopropyltrimethoxysilane. The blended monomer was added to a 2 gallon pail along with 60 g of a catalyst blend of t-butyl peroctoate and toluene. 2332 g of toluene was charged and heated until reflux. The monomer blend was added to the catalyst blend using an addition funnel at a rate of 500 mL every 15 minutes. After the entire monomer blend was added, the remaining catalyst blend (84.9 g) was added in 22 minutes. After all the catalyst was added, the reactor was allowed to cool to approximately 100° F. and was then was placed into a 1 gallon pail. The P1 polymer exhibited a molecular weight of 72,361 g/mol, a viscosity of 4960#4 @ 10 rpm, (Brookfield RVT using spindle #4 at 10 rpm) and % solids of 67%.

The P2 polymer was prepared in the same manner as was the P1 polymer, except that the amount of vinyl trimethoysilane added was 22.7 grams. The results are shown in Table III.

TABLE III

|  | Polymer P1 | Polymer P2 |
|---|---|---|
| Monomer Blend |  |  |
| Butyl acrylate | 2169 g | 2169 g |
| Methyl acrylate | 2434 g | 2434 g |
| Lauryl methacrylate | 786 g | 786 g |
| Methyl trimethoxysilane | 18.7 g | 18.7 g |
| Acrylonitrile | 64 g | 64 g |
| Vinyl trimethoxysilane | 7.5 g | 22.7 g |
| g-mercaptopropyltrimethoxysilane | 22.6 g | 22.6 g |
| Catalyst Blend |  |  |
| t-butyl peroctoate | 18.9 g | 18.9 g |
| toluene | 126 g | 126 g |
| Initial solvent |  |  |
| toluene | 2332 g | 2332 g |

EXAMPLE IV

The P1 and P2 polymers described in EXAMPLE III were used to make sealants of the present invention described below as S1, S2, and S3 in Table IV. S1 was prepared as follows: 3042 g of P1 polymer was added to a bowers mixer and the sweep and disperse blades were started. 46 g of methyltrimethoxysilane and 183 grams of fumed silica were added and mixed for 15 minutes.

In addition, 30 grams of g-glycidoxypropyltrimethoxysilane, 15 grams of a wetting agent and 15 grams of dioctyl tin dilaurate catalyst was added via vacuum and mixed for 20 minutes. The reactor was heated using steam and a vacuum was pulled on the mixer. Toluene was vacuumed off and collected in a cold trap. 749 g of toluene was collected and a 92.5–93.4% solid yield was calculated. The S1 sealant exhibited a glass peel cohesive failure (CF) value of 27.0 and an aluminum peel cohesive failure (CF) value of 21.0 (85%).

S2 was prepared by the method used to prepare S1, except that no wetting agent was used and P2 was used in place of P1. In addition, 5.9 grams of propylene carbonate was used. In addition, 898 g of toluene was vacuumed and weighed and a 98.5–98.8% solid yield was calculated. The S2 sealant exhibited a 17.5 glass peel adhesive failure (AF) value and a 15.0 aluminum peel adhesive failure (AF) value.

S3 was prepared by the same method used to prepare S1 and S2, except that no wetting agent was used and P1 polymer was used. In addition, 8.0 g of propylene carbonate was used. 1020.0 g of toluene was vacuumed off and collected and a 99–99.3% yield was calculated. S3 exhibited a 26.0 CF glass peel cohesive failure (CF) value and a 18.75 aluminum peel adhesive failure (AF) value. The results are shown below in Table IV. Table IV.

TABLE IV

|  | SEALANTS | | |
|---|---|---|---|
| Components | S1 | S2 | S3 |
| P1 polymer | 3042 g | — | 3188 g |
| P2 polymer | — | 2367 | — |
| methyl trimethoxysilane | 46 g | 35.5 g | 47.8 g |
| fumed silica | 183 g | 142 g | 191 g |
| g-glycidoxypropyltrimethoxysilane | 30 g | 24 g | 32 g |
| wetting Agent | 15 g | — | — |
| propylene carbonate | — | 5.9 g | 8 g |
| dioctyl tin dilaurate | 15 g | 12 g | 16 g |
| toluene reclaimed | 749 g | 898 g | 1020 g |
| % solids | 93.4% | 98.5–98.8% | 99–99.3% |
| glass peels | 27.0 CF | 17.5 AF | 26.0 CF |
| aluminum peels | 21.0 (85%) CF | 15.0 AF | 18.75 AF |

While the present invention has been described in reference to illustrative embodiments, this description is not intended to be construed in a limiting senoe. Various modifications and combinations of the illustrative embodiments, as well as other embodiments of the present invention, will be apparent to persons skilled in the art upon reference to the detailed description. It is therefore intended that the appended claims encompass any such modifications or embodiments.

What is claimed is:

1. A process for producing a sealant comprising the step of:
   contacting in a reactor under reaction conditions
   a polymer comprising at least one vinyl, acrylate, or methacrylate monomer and at least one silane comonomer,
   at least one polymer capping agent,
   a catalyst, and
   a reactive diluent, wherein the reactive diluent is an alkylene carbonate.

2. The process of claim 1, wherein the silane comonomer of the polymer is selected from the group consisting of methyl trimethoxysilane, methyl triethoxysilane, octyl triethoxysilane, methyl trioximinosilane, vinyl trimethoxysilane, vinyltriethoxysilane, vinyltris (2-methoxyethoxy) silane, 3-[tris (trimethylsiloxy) silyl] propyl methacrylate, vinyl methyldimethoxy silane, vinyl methyldiethoxy silane, vinylphenyldimethoxysilane vinyl oximino silane, and mixtures thereof.

3. The process of claim 1, wherein the silane comonomer is a mixture of methyl trimethoxysilane and vinyl trimethoxysilane.

4. The process of claim 1, wherein the vinyl, acrylate, or methacrylate monomer is substantially linear.

5. The process of claim 1, wherein the acrylate monomer is selected from the group consisting of methyl acrylate, ethyl acrylate, butyl acrylate, 2-ethyl hexyl acrylate, and mixtures thereof.

6. The process of claim 1, wherein the methylacrylate monomer is selected from the group consisting of lauryl methacrylate, methyl methacrylate, ethyl methacrylate, butyl methacrylate octyl methacrylate and stearyl methacrylate, and mixtures thereof.

7. The process of claim 1, wherein the vinyl monomer is selected from the group consisting of vinyl acetate, acrylonitrile, methacrylonitrile, styrene, dioctyl fumarate, dioctyl maleate and maleic anhydride.

8. The process of claim 1, wherein the monomer comprises butylacrylate, methylacrylate, and lauryl methacrylate.

9. The process of claim 1, wherein the polymer capping agent is an alkoxy silane.

10. The process of claim 1, wherein the polymer capping agent is selected from the group consisting of mercapto— containing alkoxy silanes, g-glycidoxypropyltrimethoxysilane and mixtures thereof.

11. The process of claim 1, wherein the sealant contains in the range from about 90 to about 99 weight percent solid yield.

12. The process of claim 1, wherein the sealant contains in the range of from about 95 to about 99 weight percent solid yield.

13. The process of claim 1, wherein the sealant contains in the range of at least 98 weight percent solid yield.

14. The process of claim 1, wherein the sealant contains a glass peel cohesive failure (CF) value in the range of from about 16 to 36 pounds-force per inch of width, and an aluminum peel adhesive failure (AF) value in the range of from about 8.75 to about 28.75 pounds-force per inch of width.

15. The process of claim 1, wherein the polymer has a molecular weight in the range of from about 50,000 g/mol to about 150,000 g/mol.

16. The process of claim 1, wherein the sealant has a viscosity in the range of from about 1000 to about 50,000 Centipose and determined using a 70% solution in toluene at room temperature.

17. The process of claim 1, wherein the catalyst is a mixture of t-butyl peroctoate, toluene, and dioctyl tin dilaurate.

18. A sealant composition comprising:
a polymer comprising at least one vinyl, acrylate or methacrylate monomer and at least one silane comonomer,
at least one polymer capping agent,
a catalyst, and
a byproduct of a reactive diluent, wherein the reactive diluent is an alkylene carbonate.

19. The sealant of claim 18, further comprising an additive.

20. The sealant of claim 19, wherein the additive comprises fumed silica, g-glycidoxypropyltrimethoxysilane, and a wetting agent.

21. The sealant of claim 18, wherein the silane comonomer of the polymer is selected from the group consisting of methyl trimethoxysilane, methyl triethoxysilane, octyl triethoxysilane, methyl trioximinosilane, vinyl trimethoxysilane, vinyltriethoxysilane, vinyltris (2-methoxyethoxy) silane, 3-[tris (trimethylsiloxy) silyl] propyl methacrylate, vinyl methyldimethoxy silane, vinyl methyldiethoxy silane, vinylphenyldimethoxysilane vinyl oximino silane, and mixtures thereof.

22. The sealant of claim 18, wherein the silane comonomer is a mixture of methyltrimethoxysilane and vinyl trimethoxysilane.

23. The sealant of claim 18, wherein the vinyl, acrylate, or methacrylate monomer is substantially linear.

24. The sealant of claim 18, wherein the acrylate monomer is selected from the group consisting of methyl acrylate, ethyl acrylate, butyl acrylate, 2-ethyl hexyl acrylate, and mixtures thereof.

25. The sealant of claim 18, wherein the methylacrylate monomer is selected from the group consisting of, lauryl methacrylate, methyl methacrylate, ethyl methacrylate, butyl methacrylate octyl methacrylate and stearyl methacrylate, and mixtures thereof.

26. The sealant of claim 18, wherein the vinyl monomer is selected from the group consisting of vinyl acetate, acrylonitrile, methacrylonitrile, styrene, dioctyl fumarate, dioctyl maleate and maleic anhydride.

27. The sealant of claim 18, wherein the monomer comprises butylacrylate, methylacrylate, and lauryl methacrylate.

28. The sealant of claim 18, wherein the polymer capping agent is an alkoxy silane.

29. The sealant of claim 18, wherein the polymer capping agent is selected from the group consisting of mercapto— containing alkoxy silanes, g-glycidoxypropyltrimethoxy silane, and mixtures thereof.

30. The sealant of claim 18, wherein the sealant contains in the range of from about 90 to about 99 weight percent solid yield.

31. The sealant of claim 18, wherein the sealant contains in the range of from about 95 to about 99 weight percent solid yield.

32. The sealant of claim 18, wherein the sealant contains in the range of at least 98 weight percent solid yield.

33. The sealant of claim 18, wherein the sealant has a glass peel cohesive failure (CF) value in the range of from about 16 to 36 pounds-force per inch of width, and an aluminum peel adhesive failure (AF) value in the range of from about 8.75 to about 28.75 pounds-force per inch of width.

34. The sealant of claim 18, wherein the polymer contains a molecular weight in the range of from about 50,000 g/mol to about 150,000 g/mol.

35. The sealant of claim 18, wherein the sealant contains a viscosity in the range of from about 1000 to about 50,000 Centipose and determined using a 70% solution in toluene at room temperature.

36. The sealant of claim 18, wherein the catalyst is a free radical genemtor selected from the group consisting of azo, peroxide, and hydroperoxide catalysts, and mixtures thereof.

37. The sealant of claim 18, wherein the catalyst is a mixture of t-butyl peroctoate, toluene, and dioctyl tin dilaurate.

* * * * *